United States Patent
Bahary et al.

(10) Patent No.: US 9,043,378 B2
(45) Date of Patent: May 26, 2015

(54) MULTIPLY AND ACCUMULATE FEEDBACK

(71) Applicant: Freescale Semiconductor, Inc., Austin, TX (US)

(72) Inventors: Robert Bahary, Alrington Heights, IL (US); Eric J. Jackowski, Chicago, IL (US); Leo G. Dehner, Austin, TX (US); Jayakrishnan C. Mundarath, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 282 days.

(21) Appl. No.: 13/632,616

(22) Filed: Oct. 1, 2012

(65) Prior Publication Data

US 2014/0095572 A1   Apr. 3, 2014

(51) Int. Cl.
  *G06F 7/523*   (2006.01)
  *G06F 7/544*   (2006.01)

(52) U.S. Cl.
  CPC .............. *G06F 7/5443* (2013.01); *G06F 7/544* (2013.01)

(58) Field of Classification Search
  None
  See application file for complete search history.

(56) References Cited

U.S. PATENT DOCUMENTS

| | | | |
|---|---|---|---|
| 5,692,020 A * | 11/1997 | Robbins | ........................ 375/350 |
| 6,026,420 A | 2/2000 | DesJardins et al. | |
| 6,058,500 A | 5/2000 | DesJardins et al. | |
| 7,193,461 B2 | 3/2007 | Mobin et al. | |
| 7,676,535 B2 * | 3/2010 | Donofrio et al. | .............. 708/495 |
| 2002/0041682 A1 | 4/2002 | Lambert | |
| 2008/0298500 A1 | 12/2008 | Norris et al. | |
| 2011/0032033 A1 | 2/2011 | Keerthi et al. | |

OTHER PUBLICATIONS

John Wood, Freescale Semiconductor, Inc., Digital Pre-Distortion Techniques for RF Power Amplifiers, Jan. 27, 2010.
Milos D. Ercegovac et al., Solving Systems of Linear Equations in Complex Domain: Complex E-Method, 2007.
C. Sidney Burrus et al., Homer's Method for Evaluating and Deflating Polynomials, Nov. 26, 2003.
R.E. Overill et al., Data Parallel Evaluation of Univariate Polynomials by the Knuth-Eve Algorithm, Parallel Computing, 1997.
John Wood, What's New in Digital Pre-Distortion, Feb. 2012.

* cited by examiner

*Primary Examiner* — Michael D Yaary
(74) *Attorney, Agent, or Firm* — Terrile, Cannatti, Chambers & Holland, LLP; Michael Rocco Cannatti

(57) ABSTRACT

A method and apparatus may be used to evaluate a polynomial by initializing a multiply and accumulate feedback apparatus (260) comprising a multiplier stage (264) having an output coupled to an input of an accumulator stage (267) having an accumulator feedback output (269) selectively coupled to an input of the multiplier stage over a plurality of clock cycles; iteratively calculating a final working loop variable z over an additional plurality of clock cycles; multiplying the final working loop variable z and a complex input vector x to compute a final multiplier value; and adding a least significant complex polynomial coefficient to the final multiplier value using the multiplier stage of the multiply and accumulate feedback apparatus to yield a result of the polynomial evaluation.

20 Claims, 3 Drawing Sheets

MULTIPLY AND ACCUMULATE FEEDBACK

BACKGROUND OF THE INVENTION

1. Field of the Invention

The present invention is directed in general to field of information processing. In one aspect, the present invention relates to the evaluation of polynomials.

2. Description of the Related Art

Wireless communication devices, such as mobile devices and base stations, typically include transmitter and receiver circuits (i.e., transceivers) in which power amplifiers are used to amplify a signal before wireless transmission to another device. However, some radio frequency (RF) power amplifiers generate out-of-band spurious emissions or otherwise add non-linear distortion to the amplified signal, where the distortion may include, for example, variations in phase differences and/or variations in amplitude differences. Significant distortion may result in poor signal quality. Traditional approaches for meeting the out-of-band spurious transmission requirements would operate the power amplifier well below its maximum output power, or require very expensive and inefficient power amplifiers which are designed according to the maximum peak power that they have to handle. In order to reduce the cost and improve efficiency of the power amplifier, digital pre-distortion (DPD) systems have been developed to compensate for the intrinsic distortion characteristics of non-linear power amplifier devices. A traditional DPD system determines an error signal which reflects differences between an input signal and a feedback signal from the system output, and then uses the error signal to determine a complementary distortion or inverse gain signal which is combined with the input signal to produce a pre-distorted signal that is input to the power amplifier device. In many cases, this process results in effective cancellation of the distortion (i.e., the non-linearities) produced within the system, and a more linear output signal may result. One approach for performing digital pre-distortion uses a polynomial model of the power amplifier that is evaluated to generate a pre-distortion function that is applied at the amplifier input to obtain a linear gain output. Other pre-distortion processes use one or more polynomials to adjust the input signal prior to amplification in order linearize the amplifier gain. In any case, the real-time processing requirements for evaluating a polynomial can impose significant complexity and processing costs in terms of the significant digital processing resources required to evaluate the polynomial.

BRIEF DESCRIPTION OF THE DRAWINGS

The present invention may be understood, and its numerous objects, features and advantages obtained, when the following detailed description of a preferred embodiment is considered in conjunction with the following drawings, in which.

DETAILED DESCRIPTION

Figure 1:
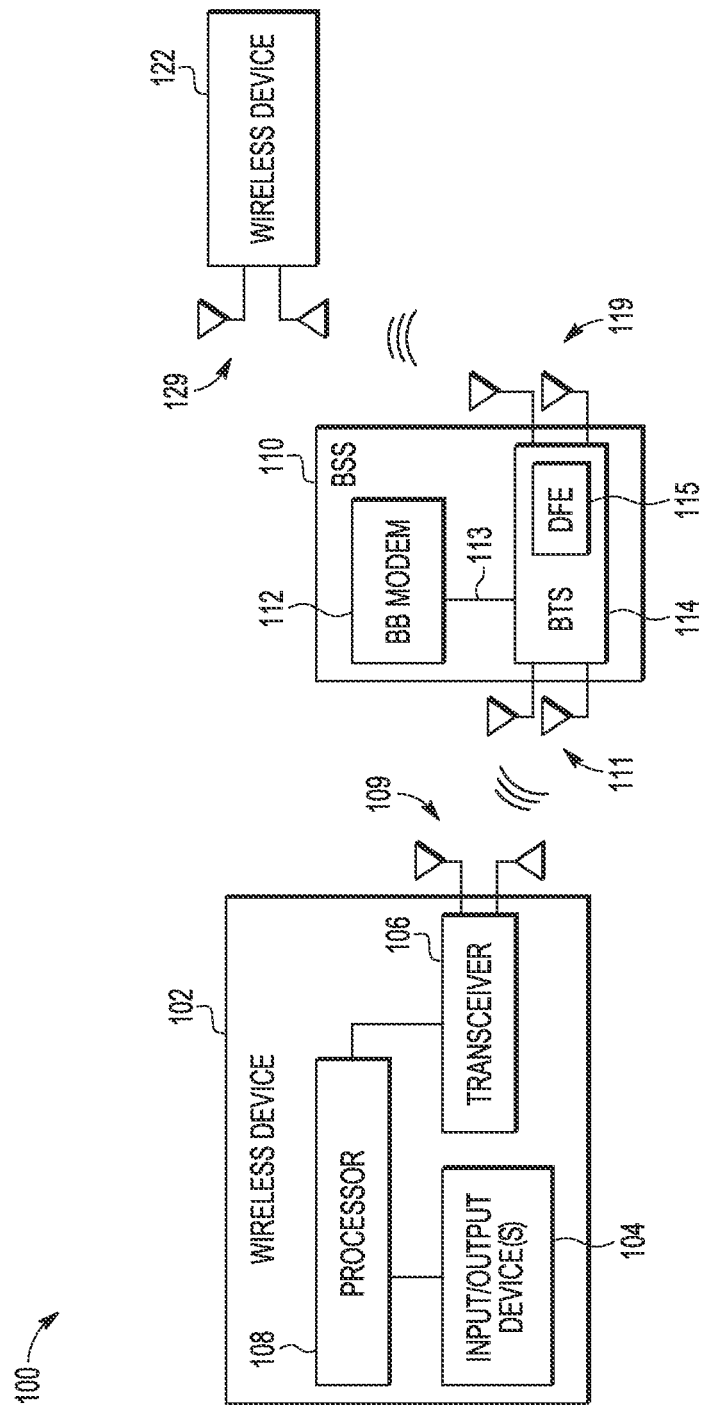
FIG. 1 is a simplified block diagram of a wireless communication system with a base station system deployed with a plurality of radio base station subsystems in accordance with selected embodiments of the present disclosure.

A system, apparatus, and methodology are described for evaluating a polynomial with a high throughput and power efficient multiply and accumulate feedback hardware. In selected embodiments, a single chip digital front end processor at a base station performs digital pre-distortion on a composite multi-carrier waveform by using integrated multiply and accumulate feedback hardware to perform Horner's processing algorithm to calculate polynomial values from a complex input vector. For example, a scalable vector signal processor (VSP) may be optimized to perform digital pre-distortion (DPD) by including multiply and accumulate feedback hardware or firmware having first and second stages arranged in a pipelined feedback configuration to receive absolute or magnitude values from a complex input vector and complex polynomial coefficient values which are processed to evaluate the complex polynomial against the complex input vector, such as by finding the value of the complex polynomial using Horner's method. In the first stage, first and second storage devices (e.g., flops) are connected to an input multiplier for generating a first stage product at each clock cycle, where the first storage device stores absolute or magnitude values from a complex input vector, and the second storage device stores the multiplexed output of either an initialization value of the highest order complex polynomial coefficient or a feedback output sum generated by the second stage. In the second stage, third and fourth storage or flop devices are connected to an output adder or accumulator for generating an output sum, where the third storage device stores the first stage product from the previous clock cycle, and the fourth storage device stores lower order complex polynomial coefficient values from the polynomial being solved. The output from the second stage is stored in a fifth storage or flop device for feedback to the first stage, and the values provided to the first, second, and fourth storage devices may be retrieved from one or more register files by control logic (not shown) which implements the polynomial evaluation methods described herein. In selected embodiments, the multiply and accumulate feedback hardware/firmware may be used to efficiently evaluate a complex polynomial v of order P against a complex input vector (e.g., $x=(x_0, x_1, \ldots x_N)$) using Horner's method. As an initial step, the first and second stages of the multiply and accumulate feedback hardware/firmware are initialized to compute an initial working value $z=a_{P-1}+a_P^*|x|$, where $|x|$ is vector with N real elements, each of which represents the magnitude of N complex signal samples $(x_0, x_1, \ldots x_N)$, and where $a_P$ and $a_{P-1}$ are the two highest order complex polynomial coefficients. Subsequently, the multiply and accumulate feedback hardware/firmware iteratively calculates an updated working value $z=a_{P-1-i}+z^*|x|$ for each of the N values $(|x_0|, |x_1|, \ldots |x_N|)$ from the complex input vector for $i:=1:P-2$. Finally, the multiply and accumulate feedback hardware/firmware calculates the complex sum $y=a_0+z^*x$ by adding the least order complex polynomial coefficient to the product of the final updated working value z and the complex input vector x. In this way, the multiply and accumulate feedback hardware/firmware can operate in parallel to allow single cycle throughput with pipelining of the multiplier and adder operations to simultaneously evaluate a complex polynomial against different values from a complex input vector.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

In this disclosure, Applicants have provided an improved system, apparatus, and method for evaluating a polynomial against a one or more complex input vectors by pipelining Horner calculations in a multiply and accumulate feedback circuit that address various problems in the art where various limitations and disadvantages of conventional solutions and technologies will become apparent to one of skill in the art after reviewing the remainder of the present application with reference to the drawings and detailed description which follow.

Turning now to FIG. 1, there is shown a simplified block diagram of a wireless communication system 100 having digital front end (DFE) modules at one or more multi-antenna system nodes for performing digital pre-distortion on transmit signals prior to power amplification. The depicted wireless communication system 100 includes a plurality of wireless devices or subscriber stations 102, 122 (e.g., hand-held computers, personal digital assistants (PDAs), cellular telephones, etc.) that wirelessly communicate with one or more base station systems (BSS) 110 (e.g., enhanced Node-B or eNB devices). Each wireless devices (e.g., 102) may include a processor 108 (e.g., a digital signal processor), a transceiver 106 connected to one or more antennas 109, and one or more input/output devices 104 (e.g., a camera, a keypad, display, etc.), along with other components (not shown). The wireless devices 102, 122 use attached antennas 109, 129 to wirelessly communicate with the base station system (BSS) 110 via antennas 111, 119 to receive or transmit voice, data, or both voice and data.

In the depicted arrangement, the base station system 110 is deployed with a plurality of radio base station subsystems or nodes, including a baseband modem 112 (e.g., radio equipment control device) and at least one base transceiver station (BTS) 114 connected to one or more antennas 111, 119 to function as a radio equipment device. In the illustrated topology, the baseband modem 112 is connected over a network link 113 (e.g., CPRI link) to a first BTS 114.

In the embodiments shown, the base transceiver station 114 includes a digital front end (DFE) processor 115 which may be implemented as a single integrated circuit to provide the digital components of the cellular base station RF subsystem. The digital components consolidated on each DFE 115 may include one or more control processors and digital transmit/receive filters, as well as interface peripherals and other I/O for RF subsystem functions. In addition and as described more fully below, each DFE 115 may include a transmit processing path for each antenna which performs signal processing on the transmit signal, including digital pre-distortion processing. The DPD-processed transmit signal is then provided to a power amplifier and associated antenna, thereby forming a separate DFE-power amplifier chain for each transmit antenna. As will be appreciated, the DPD processing techniques disclosed herein with reference to the base station system 110 may also be used in connection with a multi-antenna wireless communication device, such as the wireless devices 102, 122. To this end, each wireless device 102, 122 may also include a digital front end (DFE) processor or equivalent circuitry connected to a corresponding transceiver unit which includes a transmit processing path for each antenna which performs signal processing on the transmit signal.

Figure 2:
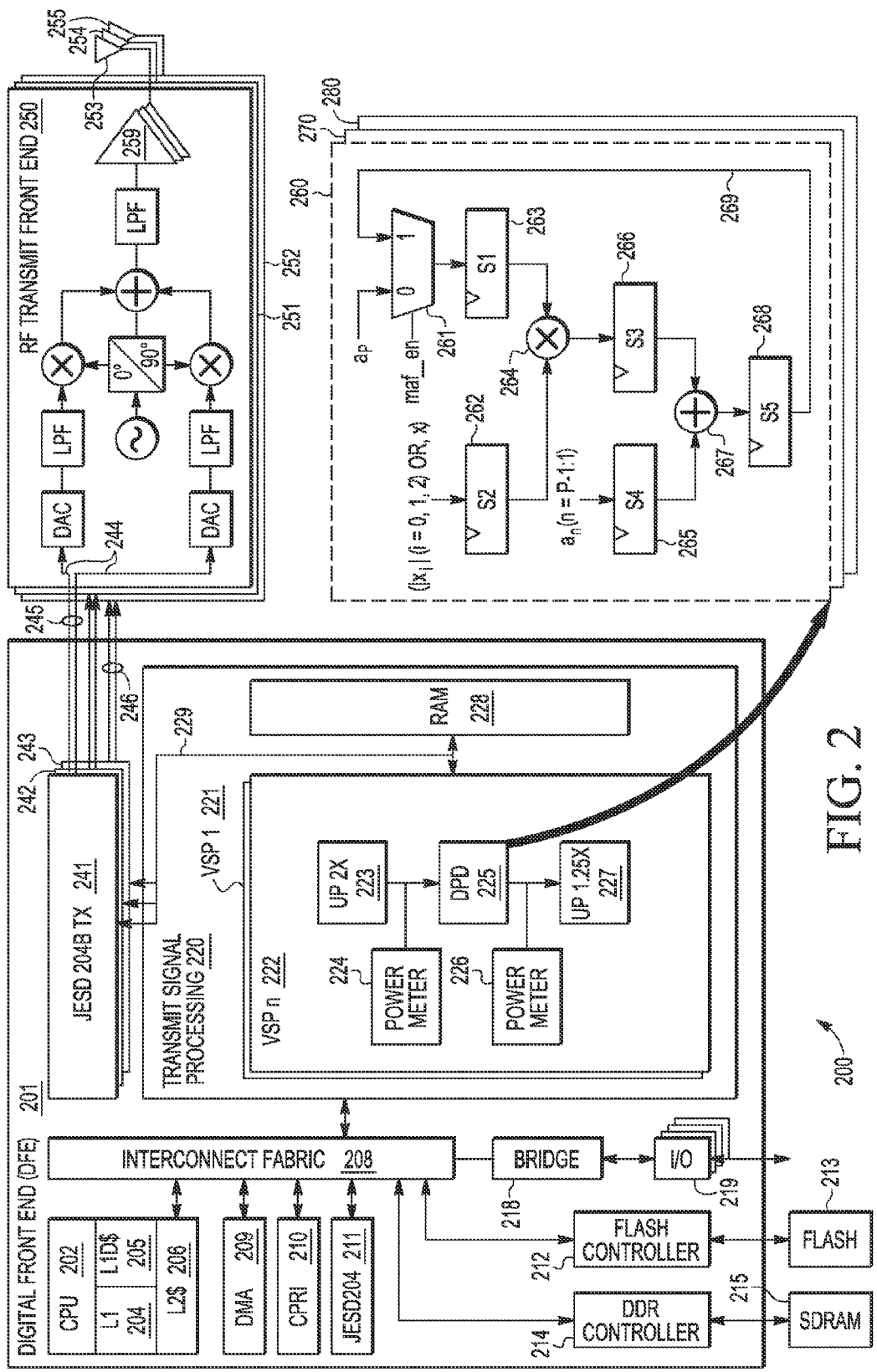
FIG. 2 is a block diagram illustration of a base station system having a multi-antenna radio frequency (RF) subsystem with a single chip digital front end (DFE) processor having integrated digital pre-distortion using multiply and accumulate feedback hardware to efficiently perform Horner algorithm evaluation of different values from the same input vector.

To illustrate selected digital pre-distortion processing applications of the integrated multiply and accumulate feedback hardware disclosed herein, reference is now made to FIG. 2 which depicts is a high level architecture block diagram illustration of a multi-antenna radio frequency (RF) base station subsystem 200 which performs pre-distortion using the multiply and accumulate feedback hardware to efficiently perform Horner algorithm evaluation of different values from the same input vector. The RF base station subsystem 200 is connected to a base station controller (not shown), and includes a single chip digital front end (DFE) processor 201 connected over one or more RF transmit front end circuits 250-252 to one or more antennas 253-255, respectively. As will be appreciated, a radio receiver front end may be understood to refer to all circuitry between the antenna and the first intermediate frequency (IF) stage, including analog and digital receiver components that process the signal at the original incoming radio frequency (RF) before it is converted to an intermediate frequency (IF). In this arrangement, the digital front end (DFE) processor 201 may be located in a radio head that is co-located with the base station controller, or may be located at a remote radio head that is not co-located with the base station controller. For simplicity of illustration, the transmit antennas 253-255 are shown as being connected to the respective transmit front end circuits 250-252, but it will be appreciated that the transmit antennas 253-255 may be shared for both signal transmission and reception in a shared or switched circuit arrangement.

Connected to each transmit antenna (e.g., 253) is an RF transmit front end circuit (e.g., 250) which includes RF conversion circuit components (e.g., digital-to-analog converters, low pass filters, oscillators, splitters, mixers, amplifiers, etc.) for converting and filtering the digital i and Q samples 244 output by the DFE processor 201 to a combined analog signal that is filtered and amplified (e.g., with one or more RF power amplifiers 259) for transmission by a corresponding antenna (e.g., 253). In similar fashion, each receive antenna may be connected to an RF receive front end circuit (not shown) which includes RF conversion circuit components (e.g., bandpass filters, splitters, low pass filters, oscillators, mixers, amplifiers, analog-to digital converters, etc.) that process the signal from the antenna received at the original incoming radio frequency (RF) and convert it for processing by the DFE processor 201. Though the RF front end circuits (e.g., 250) employ the depicted RF conversion and power amplifier circuit components, it will be appreciated that other RF conversion circuit arrangements and power amplifier components can be used.

The digital front end (DFE) processor 201 is provided to perform digital signal processing for the RF base station subsystem 200 across the separate transmit antennas 253-255. To this end, the DFE processor 201 partitions transmit signals to the antennas into transmit processing paths, and communicates with the baseband modem through the Common Public Radio Interface (CPRI) interface 210 and/or JESD204A/B interface 211. The DFE processor 201 may include one or more control processors 202 (e.g., one or more processor cores), memory subsystems (e.g., L1 instruction cache 204, L1 data cache 205, L2 cache 206), memory controllers (e.g., DMA controller 209, flash controller 212, and DDR controller 214) for interfacing with external memory (e.g., Flash memory 213, SDRAM 215), one or more modem interfaces (e.g., CPRI interface 210 and JESD204A/B interface 211), and I/O facilities (e.g., host bridge 218) for I/O devices 219. As a general matter, any of a variety of memory designs and hierarchies may be employed in, or in conjunction with, with the DFE processor 201. Also, it will be appreciated that the I/O devices 219 may include any desired I/O device, such as Ethernet, I2C, SPI, GPTO, and/or UART devices. All processor subsystems are linked by a multi-level interconnect fabric 208.

To digitally process transmit signals, the DFE processor 201 may also include a programmable transmit signal processing path for each transmit antenna 253-255 which is formed with a transmit signal processor 220 and an associated serialized interface 241-243 (e.g., a JESD204B TX interface) and RE transmit front end 250-252. The transmit signal processor 220 may include one or more processors 221-222 (e.g., vector signal processors VSPl and VSPn) and associated memory 228 (e.g., RAM) for performing carrier-related signal processing and antenna-specific processing on IQ samples received from the baseband modem. Signal processing along each transmit signal path may be divided between the processors 221-222 and shared memory 228. For example, a first vector signal processor 221 (VSP1) may be used to scale, filter, interpolate, up-sample, and combine multiple carriers into a composite carrier, and then perform crest factor reduction on the composite carrier. After crest factor reduction, the CFR-processed signal may be transferred to the shared RAM 228. At this point, a second vector signal processor 222 (VSP n) may be used to perform dynamic pre-distortion, interpolation, and/or other signal processing on the output IQ samples retrieved from shared memory 228. For example, retrieved IQ samples from shared RAM 228 are stored in an internal VSP buffer (not shown), up-sampled by interpolator 223 (e.g., by 2x), measured with a first power meter 224, processed through the DPD module 225, measured with a second power meter 226, and then up-sampled by interpolator 227 (e.g., by 1.25x) to a final sample rate for storage in the internal VSP buffer (not shown). The power meters 224, 226 are used to monitor the power profile of the transmit signal. Once signal processing is completed, the transmit signal processor 220 may send the processed samples over a signal/buss line 229 to an associated serialized interface (e.g., JESD204B TX 241) for transfer to the transceiver (e.g., 250) over IQ signal lines 244. In this way, a first antenna path is formed by the connection of the transmit signal processor 220 and JESD204B TX interface 241 which are connected over IQ signal lines 244 to transceiver 250 and antenna 253, a second antenna path is formed by the connection of the transmit signal processor 220 and JESD204B TX interface 242 which are connected over IQ signal lines 245 to transceiver 251 and antenna 254, and a third antenna path is formed by the connection of the transmit signal processor 220 and JESD204B TX interface 243 which are connected over IQ signal lines 246 to transceiver 252 and antenna 255.

With each transmit signal path between the DFE processor 201 and antennas 253-255, the output signal (e.g., 244) provided to the RF transmit front end (e.g., 250) is amplified by RF power amplifier circuitry (e.g., 259) which can generate out-of-band spurious emissions or otherwise add non-linear distortion to the amplified signal. To maintain linear operation and prevent or reduce distortion, digital pre-distortion (DPD) systems are used to compensate for the intrinsic distortion characteristics of non-linear power amplifier devices. However, there is significant processing complexity and other costs associated with implementing DPD algorithms, such as the substantial digital processing required to evaluate the complex polynomial models of the power amplifier.

To efficiently evaluating a complex polynomial, the DPD module 225 may include one or more multiply and accumulate feedback hardware or firmware structures 260, 270, 280 which may be used to perform Horner's processing algorithm to calculate N polynomial values (e.g., $y=(y_0, y_1, \ldots y_N)$) of a complex polynomial of order P based on N complex input values (e.g., $x=(x_0, x_1, \ldots x_N)$). In this example, the complex polynomial is defined by a set of complex polynomial coefficients $\{a_0, a_1, \ldots, a_P\}$ such that $y=a_0+a_1*x+a_2*x*|x|+a_3*x*|x|^2+ \ldots +a_P*x*|x|^{P-1}$. Under Horner's method (a.k.a., Horner's scheme or rule or algorithm), the polynomial y is transformed into a computationally efficient form $y=a_0+x*(a_1+a_2*|x|+a_3*|x|^2+ \ldots +a_P*|x|^{P-1})=a_0+x*z$, where z is defined as a working or loop variable $z=(a_1+a_2*|x|+a_3*|x|^2+ \ldots +a_P*|x|^{P-1})$.

To implement Horner's method, the multiply and accumulate feedback hardware or firmware structures 260 may include a first multiplier stage 264 and a second accumulator stage 267 arranged in a pipelined feedback configuration via feedback line 269 to receive absolute or magnitude values from a real input vector |x| and complex polynomial coefficient values $\{a_0, a_1, \ldots, a_P\}$ which are processed to evaluate a complex polynomial y against the complex input vector x using Horner's method. The multiplier stage 264 implements the multiplication operation in Horner's rule by multiplying magnitude values from the real vector |x| and the results of the accumulator stage 267. As will be appreciated, the multiplier stage 264 and/or accumulator stage 267 may implement polynomial multiplication or additions with modulo-2 arithmetic rather than ordinary arithmetic, and may be implemented in software or in hardware by electrical circuitry, combinational logic, exclusive-or ("XOR") logic gates, shift registers and buffers.

In selected embodiments, the multiplier stage 264 is connected to a first storage buffer S2 262 which may be implemented as flop storage device which sequentially holds j absolute or magnitude values from a real input vector |x| which are reloaded every N clock cycles. The multiplier stage 264 is also connected to a second storage buffer S1 263 which may be connected to a multiplex selection circuit 261 that is controlled by a multiply-accumulate feedback (MAF) enable signal to output either an initialization value of the highest order complex polynomial coefficient $a_P$ or the feedback results of the accumulator stage 267. In other embodiments, the order of the multiplex selection circuit 261 and the second storage buffer S1 263 may be reversed so that the multiplexor 261 is after the storage buffer 263. The accumulator stage 267 implements the addition operation in Horner's rule by adding complex polynomial coefficient values $\{a_{P-1}, \ldots a_1, a_0\}$ to the results of the multiplier stage 264. To this end, the accumulator stage 267 is connected to a coefficient storage buffer S4 265 which holds each complex polynomial coefficient value for a plurality of N clock cycles before retrieving the next most significant complex polynomial coefficient value. At each clock cycle, the multiplier stage 264 generates a first stage product that is stored in a third storage buffer S3 266, and the output adder or accumulator stage 267 generates an output sum of the value stored in the third storage buffer S3 266 and the coefficient storage buffer S4 265 from the previous clock cycle which is stored in the fifth storage device for feedback to the first stage. As will be appreciated, the input values provided to the first, second, and fourth storage devices 263, 262, 265 may be retrieved from one or more register files by control logic (not shown) which implements the polynomial evaluation methods described herein.

In operation, the multiply and accumulate feedback hardware or firmware structure 260 may be used to efficiently evaluate a complex polynomial y of order P against a complex input vector (e.g., $x=(x_0, x_1, \ldots x_N)$) by first initializing the multiplier stage 264 and accumulator stage 267 to compute an initial working value $z=a_{P-1}+a_P*|x|$ for N values $(x_0, x_1, \ldots x_N)$ from the real vector $|x|$ of absolute values of complex input vector x. In the first N clock cycles, the initialization step processes the sequence of input values $(|x_0|, |x_1|, \ldots |x_N|)$ from the real vector $|x|$ by sequentially retrieving the sequence of input values from a register file in memory for storage in first storage buffer S2 262. At the multiplier stage 264, the retrieved sequence of input values is multiplied with the initialization value of the highest order complex polynomial coefficient $a_P$ by setting the MAF enable signal to a first control value (e.g., 0) that instructs the multiplex selection circuit 261 to output the initialization value.

In the next step, the multiply and accumulate feedback hardware/firmware 260 iteratively calculates an updated working value $z=a_{P-1-i}+z*|x|$ for each of the N values $(x_0, x_1, \ldots x_N)$ from the complex input vector for i:=1:P-1. This iterative calculation step is repeated with P-1 iterative passes, where each iterative pass uses N clock cycles at the multiplier stage 264 to multiply the sequence of input values $(|x_0|, |x_1|, \ldots |x_N|)$ from the first storage buffer S2 262 with the accumulator stage feedback outputs from the second storage buffer S1 263. As shown, the accumulator stage feedback outputs are fed back 269 through the multiplex selection circuit 261 for storage in the second storage buffer S1 263 under control of the MAF enable signal being set to a second control value (e.g., 1). In each iterative pass, the accumulator stage 267 simultaneously uses N clock cycles to add the current polynomial coefficient value $a_n$ from the coefficient storage buffer S4 265 with the multiplier stage outputs from the third storage buffer S3 266. By sequentially applying a less significant complex polynomial coefficient value at each of the P-1 iterative passes, the iterative calculation step is used to calculate a final updated working value z.

In the final step, the multiply and accumulate feedback hardware/firmware 260 calculates the complex sum $y=a_0+z*x$ by adding the least significant complex polynomial coefficient $a_0$ to the product of the final updated working value z and the complex input vector x. In this way, the multiply and accumulate feedback hardware/firmware 260 can operate in parallel to allow single cycle throughput with pipelining of the multiplier and adder operations to simultaneously evaluate a complex polynomial against different values from a complex input vector.

By configuring the multiply and accumulate feedback hardware/firmware 260 to perform complex multiply and add operations at the multiplier stage 264 and accumulator stage 267 at each clock cycle by using different values from the input vector $(X_0, x_1, x_2, \ldots)$, the pipelined efficiencies and operating speed may be significantly increased by allowing single cycle throughput and pipelining of the multiplier and adder operations. In contrast, conventional approaches for inserting pipeline delays into a complex multiplier and adder would reduce the throughput because the each iteration must wait for the result of the previous iteration. For example, the computation of a first initialization value $a_P*x_0$ by a conventional complex multiplier and adder circuit would require a plurality of clock cycles before the computation results would be available to being the iterative calculation step. However, by loading the multiply and accumulate feedback hardware/firmware 260 with other input values, additional initialization values (e.g., $a_P*x_1$ and $a_P*x_2$) can be computed while awaiting the first initialization value, thereby adding pipeline delays while still maintaining a throughput of 1. For a pipeline depth of P, P values of x may be processed in parallel.

To illustrate the operation of the multiply and accumulate feedback structure 260 during a sequence of clock cycles, the table set forth below provides an example set of values for the multiplexer control signal and selected storage registers S1, S2, S3, S4, and S5 to show the operations involved in processing Horner algorithm with N=3 pipeline stages.

| CYCLE | MAF_EN | S1 Output | S2 Output | S3 Output | S4 Output | S5 - ADD OUT |
|---|---|---|---|---|---|---|
| 0 | 0 | — | — | — | — | — |
| 1 | 0 | $a_P$ | $|x_0|$ | — | — | — |
| 2 | 0 | $a_P$ | $|x_1|$ | $a_P*(|x_0|)$ | $a_{P-1}$ | — |
| 3 | 1 | $a_P$ | $|x_2|$ | $a_P*(|x_1|)$ | $a_{P-1}$ | $z0 = a_{P-1} + a_P*(|x_0|)$ |
| 4 | 1 | z0 | $|x_0|$ | $a_P*(|x_2|)$ | $a_{P-1}$ | $z1 = a_{P-1} + a_P*(|x_1|)$ |
| 5 | 1 | z1 | $|x_1|$ | $z0*(|x_0|)$ | $a_{P-2}$ | $z2 = a_{P-1} + a_P*(|x_2|)$ |
| 6 | 1 | z2 | $|x_2|$ | $z1*(|x_1|)$ | $a_{P-2}$ | $z0 = a_{P-2} + z0*(|x_0|)$ |
| 7 | 1 | z0 | $|x_0|$ | $z2*(|x_2|)$ | $a_{P-2}$ | $z1 = a_{P-2} + z1*(|x_1|)$ |
| 8 | 1 | z1 | $|x_1|$ | $z0*(|x_0|)$ | $a_{P-3}$ | $z2 = a_{P-2} + z2*(|x_2|)$ |
| 9 | 1 | z2 | $|x_2|$ | $z1*(|x_1|)$ | $a_{P-3}$ | $z0 = a_{P-3} + z0*(|x_0|)$ |
| 10 | 1 | z0 | $|x_0|$ | $z2*(|x_2|)$ | $a_{P-3}$ | $z1 = a_{P-3} + z1*(|x_1|)$ |
| 11 | 1 | z1 | $|x_1|$ | $z0*(|x_0|)$ | $a_{P-4}$ | $z2 = a_{P-3} + z2*(|x_2|)$ |
| 12 | … | … | … | … | … | … |
| … | … | … | … | … | … | … |
| (P − 1)*3 − 6 | 1 | … | … | … | … | … |
| (P − 1)*3 − 5 | 1 | z0 | $|x_0|$ | … | … | … |
| (P − 1)*3 − 4 | 1 | z1 | $|x_1|$ | $z0*(|x_0|)$ | $a_1$ | … |
| (P − 1)*3 − 3 | 1 | z2 | $|x_2|$ | $z1*(|x_1|)$ | $a_1$ | $z0 = a_1 + z0*(|x_0|)$ |
| (P − 1)*3 − 2 | 1 | z0 | $|x_0|$ | $z2*(|x_2|)$ | $a_1$ | $z1 = a_1 + z1*(|x_1|)$ |
| (P − 1)*3 − 1 | 1 | z1 | $|x_1|$ | $z0*(|x_0|)$ | $a_0$ | $z2 = a_1 + z2*(|x_2|)$ |
| (P − 1)*3 | — | z2 | $|x_2|$ | $z1*(|x_1|)$ | $a_0$ | $z0 = a_0 + z0*(|x_0|)$ |
| (P − 1)*3 + 1 | — | — | — | $z2*(|x_2|)$ | $a_0$ | $z1 = a_0 + z1*(|x_1|)$ |
| (P − 1)*3 + 2 | — | — | — | — | — | $z2 = a_0 + z2*(|x_2|)$ |

As shown in the table, the clock cycles 0 to 2 (CYCLE=0-2) are used as initialization clock cycles to initiate the multiply and accumulate feedback structure 260. In particular, the multiply-accumulate feedback enable signal (MAF_EN) is set to a first value (e.g., 0) during the initialization clock cycles so that the multiplex selection circuit 261 outputs an initialization value of the highest order complex polynomial coefficient $a_P$. During the initialization clock cycles, the stored initialization value $a_P$ is output from the storage register S1, and the sequence of input values ($|x_0|$, $|x_1|$, $|x_2|$) is sequentially output from storage buffer S2 262. For example, at clock cycle 1 (CYCLE=1), the storage register S1 outputs the initialization value $a_0$ and the storage register S2 outputs the first input value $|x_0|$; at clock cycle two (CYCLE=2), the storage register S1 outputs the initialization value $a_P$ and the storage register S2 outputs the second input value $|x_1|$; at clock cycle three (CYCLE=3), the storage register S1 outputs the initialization value $a_P$ and the storage register S2 outputs the third input value $|x_2|$; and so on.

As the clock cycles continue, the multiplier stage 264 generates complex multiplication products that are sequentially stored in the storage buffer S3 and applied to the accumulator stage in combination with the current complex polynomial coefficient value stored in the coefficient storage buffer S4. For example, at clock cycle two (CYCLE=2), storage register S3 outputs the multiplication product of the initialization value $a_P$ and the first input value $|x_0|$, $a_P^*(|x_0|)$, that was previously generated by the multiplier stage 264, while storage register S4 outputs the current complex polynomial coefficient $a_{P-1}$. At the next clock cycle (CYCLE=3), storage register S3 outputs the multiplication product of the initialization value $a_P$ and the second input value $|x_1|$, $a_P^*(|x_1|)$, while storage register S4 continues to output the current complex polynomial coefficient $a_{P-1}$, and so on.

In the clock cycles after initiation, the addition stage 267 generates complex addition sum values that are sequentially stored in the storage buffer S5 and fed back as input to the multiplier stage 264 via multiplex selection circuit 261 and storage register S1. For example, at clock cycle three (CYCLE=3), storage register S5 outputs the initial working value z0 as the complex sum $z0=a_{P-1}+a_P^*(|x_0|)$ that was previously generated by the addition stage 267. To this end, the multiply-accumulate feedback enable signal (MAF_EN) is set to a second value (e.g., 1) in the same clock cycle so that, in subsequent clock cycles, the multiplex selection circuit 261 outputs the storage register S5 output as a feedback signal to the storage register S1. Thus, in the next clock cycle (CYCLE=4), storage register S5 outputs the initial working value z1 as the complex sum $z1=a_{P-1}+a_P^*(|x_1|)$, and at the next clock cycle (CYCLE=5), storage register S5 outputs the initial working value z2 as the complex sum $z2=a_{P-1}+a_P^*(|x_2|)$.

As the clock cycles continue, the initial working values z0, z1, z2 are iteratively updated by sequentially applying the sequence of input values ($|x_0|$, $|x_1|$, $|x_2|$) from the storage register S2 for each current complex polynomial coefficient $a_n$ supplied by the storage register S4 until the next to least significant complex polynomial coefficient value (e.g., $a_1$) has been processed. At this point, the final working values z0, z1, z2 have been calculated and fed back in the pipelined multiply and accumulate feedback structure where they can be sequentially multiplied with the complex input vector x (provided from the first storage buffer S2 262) at the multiplier stage 264, and then added with the least significant complex polynomial coefficient value $a_0$ (provided from the coefficient storage buffer S4 265) at the accumulator stage 267.

Figure 3:
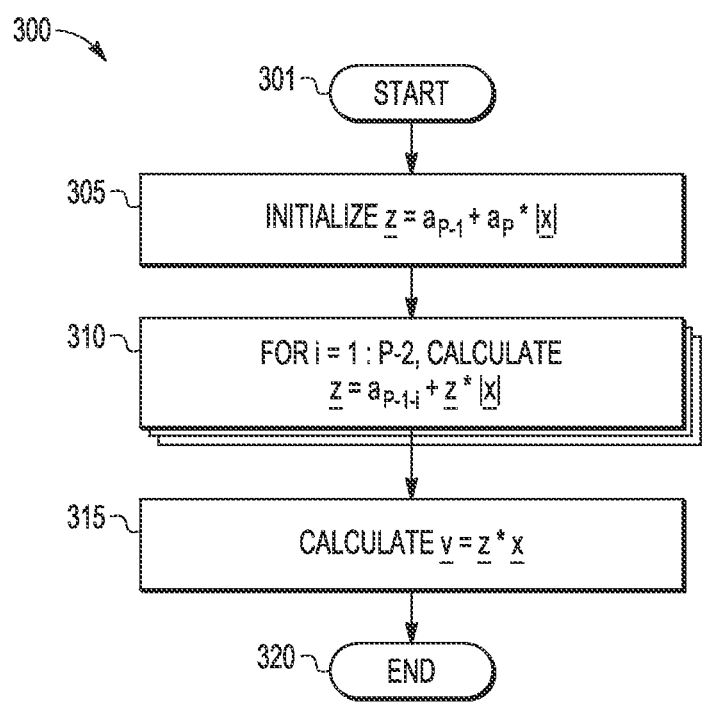
FIG. 3 shows an example flow diagram of a method for computing polynomial values using multiply and accumulate feedback hardware to perform Horner algorithm evaluation of the polynomial.

Referring now to FIG. 3, there is depicted an example flow diagram 300 of a method for computing polynomial values using a multiply and accumulate feedback mechanism to perform Horner algorithm evaluation of the polynomial in accordance with selected embodiments of the present disclosure. In the flow diagram 300, the method steps may be performed by multiply and accumulate feedback hardware or firmware having first and second stages arranged in a pipelined feedback configuration which are controlled by control logic (e.g., at the DFE). The disclosed methods provide a high throughput and power efficient mechanism for processing absolute or magnitude values from a complex input vector and complex polynomial coefficient values to evaluate the complex polynomial against the complex input vector, such as by finding the root(s) of the complex polynomial using Horner's method.

Once the method starts at step 301, input storage registers are initialized at step 305 with input values so that the multiply and accumulate feedback mechanism computes an initial working value $z=a_{P-1}+a_P^*|x|$ for N input values ($|x_0|$, $|x_1|$, ... $|x_N|$), where $a_P$ and $a_{P-1}$ are the two highest order complex polynomial coefficients. In this way, the multiply and accumulate feedback mechanism starts computing additional polynomial processing while waiting for the results from previous polynomial processing.

Once initialization is finished, the input storage registers are updated with input values so that, at step 310, the multiply and accumulate feedback mechanism iteratively calculates an updated working value $z=a_{P-1-i}+z^*|x|$ from the N values ($|x_0|$, $|x_1|$, ... $|x_N|$) for i:=1:P−2. By iteratively updating the working value by updating the input storage registers and using complex multiply and add operations that are performed in a single clock cycle while waiting for the results from previous polynomial processing, the multiply and accumulate feedback mechanism processes different values from the complex input vector $x=(x_0, x_1, x_2, ... x_N)$ to allow single-cycle throughput and pipelining of the complex multiplication and addition operations.

As a final step 315, the multiply and accumulate feedback mechanism calculates the complex sum $y=a_0+z^*x$ by adding the least significant complex polynomial coefficient $a_0$ to the product of the final updated working value z and the complex input vector x. In this way, the multiply and accumulate feedback hardware/firmware can operate in parallel to allow single cycle throughput with pipelining of the multiplier and adder operations to simultaneously evaluate a complex polynomial against different values from a complex input vector. At step 320, the method ends.

As will be appreciated, the multiply and accumulate feedback mechanism, system and methodology described herein provide efficiently evaluate complex polynomials against a complex input vector by pipelining complex multiplication and addition operations for different complex input vector values. Though the multiply and accumulate feedback mechanism may be embodied in hardware as multiplier and accumulator stages arranged in a pipelined feedback configuration with storage flop devices for holding intermediate computation results for different complex input vector values, selected aspects of the multiply and accumulate feedback mechanism may be programmed or loaded by processing circuitry (e.g., a processor or controller) executing software (e.g., including but not limited to firmware, resident software, microcode, etc.). Any such programming operation may be embodied in whole or in part as a computer program product accessible from a computer-usable or computer-readable medium providing program code for use by or in connection with a computer or any instruction execution system, where a computer-usable or computer readable medium can be any apparatus that may include, store, communicate, propagate, or transport the program for use by or in connection with the instruction execution system, apparatus, or device. Examples of a computer-readable medium include a semiconductor or solid state memory, magnetic tape, a removable computer diskette, a random access memory (RAM), a read-only memory (ROM), a rigid magnetic disk and an optical disk, such as a compact disk-read only memory (CD-ROM), compact disk-read/write (CD-R/W) and DVD.

By now it should be appreciated that there has been provided a circuit, method and system for evaluating a polynomial in an electronic system, such as may be used by performing digital pre-distortion in a base station having a radio frequency (RF) communication signal path and transceiver front end. In the disclosed circuit, method and system, a multiply and accumulate feedback apparatus is provided as hardware or firmware with a multiplier stage and an accumulator stage. The multiplier stage has an output coupled to an input of an accumulator stage, and the accumulator stage has an accumulator feedback output selectively coupled to an input of the multiplier stage. Over a plurality of clock cycles, the multiply and accumulate feedback apparatus is initialized to generate a plurality of initial working loop variables ($z_0 0$, $z_0 1$, ... $z_0 N$) at the accumulator feedback output. For example, the multiply and accumulate feedback apparatus may be initialized by providing the multiply and accumulate feedback apparatus with first and second complex polynomial coefficients $a_P$, $a_{P-1}$ and a plurality of input values ($|x_0|$, $|x_1|$, ... $|x_N|$) from a real input vector $|x|$ which are sequentially input over a plurality of clock cycles, thereby generating the plurality of initial working loop variables ($z_0 0$, $z_0 1$, ... $z_0 N$) at the accumulator feedback output. In other embodiments, the initialization may include storing a first complex polynomial coefficient $a_P$ at a first storage device coupled to a first input of the multiplier stage for the plurality of clock cycles; sequentially storing the plurality of input values ($|x_0|$, $|x_1|$, ... $|x_N|$) at a second storage device coupled to a second input of the multiplier stage during the plurality of clock cycles; storing at each clock cycle the output of the multiplier stage at a third storage device coupled to a first input of the accumulator stage; storing at each clock cycle of the plurality of clock cycles a second complex polynomial coefficient $a_{P-1}$ at a fourth storage device coupled to a second input of the accumulator stage; and storing at each clock cycle the accumulator feedback output at a fifth storage device coupled to an input of the first storage device. In yet other embodiments, the initialization may include multiplexing the first complex polynomial coefficient and the accumulator feedback output at a multiplex selection circuit by applying a first control signal to output the first complex polynomial coefficient during the plurality of clock cycles. After initialization, a final working loop variable z is calculated from the plurality of initial working loop variables over an additional plurality of clock cycles using a plurality of iterative passes of the multiply and accumulate feedback apparatus to generate a plurality of final working loop values (z0, z1, ... zN) over an additional plurality of clock cycles. For example, the final working loop variable z may be calculated by providing the multiply and accumulate feedback apparatus, at each iterative pass, with a replacement complex polynomial coefficient, the feedback output, and the plurality of input values ($|x_0|$, $|x_1|$, ... $|x_N|$) which are sequentially input over an additional plurality of clock cycles, thereby generating a plurality of final working loop values (z0, z1, ... zN) to form the final working loop variable z. In other embodiments, the final working loop variable z is calculated by storing the accumulator feedback output from the fifth storage device at the first storage device during the additional plurality of clock cycles; sequentially storing the plurality of input values ($|x_0|$, $|x_1|$, ... $|x_N|$) at the second storage device during the additional plurality of clock cycles; storing at each clock cycle the output of the multiplier stage at the third storage device; storing at each clock cycle of the additional plurality of clock cycles a complex polynomial coefficient $a_n$ at the fourth storage device; and storing at each clock cycle the accumulator feedback output at the fifth storage device. Once the final working loop variable z is calculated, it is multiplied with a complex input vector x to compute a final multiplier value using the multiplier stage of the multiply and accumulate feedback apparatus. In selected embodiments, this multiplication may be performed by storing the final working loop variable z in the first storage device; storing the complex input vector x at the second storage device; and storing the output of the multiplier stage as the final multiplier value in the third storage device. In addition, a least significant complex polynomial coefficient is added to the final multiplier value using the multiplier stage of the multiply and accumulate feedback apparatus to yield a result of the polynomial evaluation. In selected embodiments, this addition may be performed by storing the final multiplier value at the third storage device; storing the least significant complex polynomial coefficient in the fourth storage device; and storing the output of the accumulator stage as the result of the polynomial evaluation at the fifth storage device.

In another form, there is provided a hardware device and associated method of operation for evaluating a polynomial expression of order P. As disclosed, the hardware device includes a multiplier stage coupled to receive first and second multiplier operands from first and second clocked latch circuits, where the multiplier stage generates a product of the first and second multiplier operands at a multiplier stage output over a plurality of clock cycles. The hardware device also includes an accumulator stage coupled to receive a first and second addition operands from third and fourth clocked latch circuits, where the accumulator stage generates a sum of the first and second addition operands at an accumulator stage output over the plurality of clock cycles, where the accumulator stage is coupled to receive the second addition operand from the multiplier stage output, and where the accumulator stage output is selectively coupled in feedback to provide the second multiplier operand to the multiplier stage. The hardware device may also include a multiplex selection circuit coupled to receive a first complex polynomial coefficient $a_P$ at a first input and to receive the accumulator stage output at a second input, where the multiplex selection circuit is controlled to output the first complex polynomial coefficient $a_P$ only during a plurality of initiation clock cycles. The first clocked latch circuit may be implemented with a flip-flop storage device for sequentially storing a plurality of input values ($|x_0|$, $|x_1|$, ... $|x_N|$) from a real input vector $|x|$ which are sequentially input as the first multiplier operand over a plurality of clock cycles. The second clocked latch circuit may be implemented with a flip-flop storage device for storing a first complex polynomial coefficient $a_P$ during a plurality of initiation clock cycles, and for storing a plurality of final working loop values (z0, z1, ... zN) generated and fed back by the accumulator stage over an additional plurality of clock cycles. The third clocked latch circuit may be implemented with a flip-flop storage device for sequentially storing a plurality of complex polynomial coefficients ($a_{P-1}$, $a_{P-2}$, ... $a_0$), each of which is sequentially input as the first addition operand over N clock cycles. The fourth clocked latch circuit may be implemented with a flip-flop storage device for sequentially storing the product of the first and second multiplier operands generated at the multiplier stage output over a plurality of clock cycles. Finally, the hardware device may include a fifth clocked latch circuit implemented as a flip-flop storage device for sequentially storing the sum of the first and second addition operands generated at the accumulator stage output over a plurality of clock cycles. In this configuration, the clocked latch circuits may be clocked so that the multiplier stage and accumulator stage carry out Horner's rule on the polynomial expression of order P by performing complex multiply and addition operations in each clock cycle to process different values from a complex input vector $x=(x_0, x_1, \ldots x_N)$.

In yet another form, there is provided a multiply and accumulate feedback circuit for evaluating a polynomial of order P different values from a complex input vector $x=(x_0, x_1, \ldots x_N)$. As disclosed, the circuit includes a multiplier circuit for computing a product of first and second multiplier operands input to the multiplier circuit, where the product is output at a multiplier stage output at each clock cycle. The circuit also includes an accumulator circuit coupled to the multiplier stage output for computing a sum of first and second addition operands input to the accumulator circuit, where the sum is output at an accumulator stage output at each clock cycle. The circuit also includes a feedback storage device coupled to the accumulator stage output for storing the sum for feedback as in input to the multiplier circuit. The circuit also includes an input multiplexer circuit coupled to the feedback storage device for multiplexing a first complex polynomial coefficient $a_P$ and the accumulator stage output by applying a first control signal to output the first complex polynomial coefficient $a_P$ during a plurality of initiation clock cycles and to output the accumulator stage output during a plurality of additional clock cycles. In addition, the circuit includes first and second clocked storage devices for providing the first and second multiplier operands to the multiplier circuit, and third and fourth clocked storage devices for providing the first and second addition operands to the accumulator circuit. In this way, the clocked storage devices may be clocked so that the multiplier circuit and accumulator circuit carry out Horner's rule on the polynomial of order P by performing complex multiply and addition operations in each clock cycle to process different values from the complex input vector $x=(x_0, x_1, \ldots x_N)$. In selected embodiments, the first clocked storage device sequentially provides a plurality of input values ($|x_0|, |x_1|, \ldots |x_N|$) from the real input vector |x| as the first multiplier operand over the initiation clock cycles and the plurality of additional clock cycles, and the second clocked storage device provides the output from the input multiplexer circuit over the initiation clock cycles and the plurality of additional clock cycles. In other embodiments, the third clocked storage device provides a plurality of complex polynomial coefficients ($a_{P-1}, a_{P-2}, \ldots a_0$), each of which is sequentially input as the first addition operand over N clock cycles, and the fourth clocked storage device provides the multiplier stage output over the initiation clock cycles and the plurality of additional clock cycles.

Although the described exemplary embodiments disclosed herein are directed to hardware-based methods and systems for efficiently implementing the Horner algorithm, the present invention is not necessarily limited to the example embodiments illustrate herein, and various embodiments of the circuitry and methods disclosed herein may be implemented with other devices and circuit components. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus

What is claimed is:

1. A method for evaluating a polynomial in an electronic system, comprising:
    initializing a multiply and accumulate feedback apparatus comprising a multiplier stage having an output coupled to an input of an accumulator stage, the accumulator stage having an accumulator feedback output selectively coupled to an input of the multiplier stage over a plurality of clock cycles to generate a plurality of initial working loop variables ($z_0 0, z_0 1, \ldots z_0 N$) at the accumulator feedback output;
    calculating a final working loop variable z from the plurality of initial working loop variables using a plurality of iterative passes of the multiply and accumulate feedback apparatus to generate a plurality of final working loop values (z0, z1, ... zN) over an additional plurality of clock cycles;
    multiplying the final working loop variable z and a complex input vector x to compute a final multiplier value using the multiplier stage of the multiply and accumulate feedback apparatus; and
    adding a least significant complex polynomial coefficient to the final multiplier value using the multiplier stage of the multiply and accumulate feedback apparatus to yield a result of the polynomial evaluation.

2. The method of claim 1, where the method for evaluating the polynomial is used to perform digital pre-distortion in the electronic system.

3. The method of claim 1, where initializing the multiply and accumulate feedback apparatus comprises providing the multiply and accumulate feedback apparatus with first and second complex polynomial coefficients and a plurality of input values ($|x_0|, |x_1|, \ldots |x_N|$) from a real input vector |x| which are sequentially input over a plurality of clock cycles, thereby generating the plurality of initial working loop variables ($z_0 0, z_0 1, \ldots z_0 N$) at the accumulator feedback output.

4. The method of claim 3, where initializing the multiply and accumulate feedback apparatus comprises multiplexing the first complex polynomial coefficient and the accumulator feedback output at a multiplex selection circuit by applying a first control signal to output the first complex polynomial coefficient during the plurality of clock cycles.

5. The method of claim 3, where calculating the final working loop variable z comprises providing the multiply and accumulate feedback apparatus, at each iterative pass, with a replacement complex polynomial coefficient, the feedback output, and the plurality of input values ($|x_0|, |x_1|, \ldots |x_N|$) which are sequentially input over an additional plurality of clock cycles, thereby generating a plurality of final working loop values ($z_0, z_1, \ldots z_N$) to form the final working loop variable z.

6. The method of claim 1, where initializing the multiply and accumulate feedback apparatus comprises:
   storing a first complex polynomial coefficient $a_p$ at a first storage device coupled to a first input of the multiplier stage for the plurality of clock cycles;
   sequentially storing the plurality of input values ($|x_0|, |x_1|, \ldots |x_N|$) at a second storage device coupled to a second input of the multiplier stage during the plurality of clock cycles;
   storing at each clock cycle the output of the multiplier stage at a third storage device coupled to a first input of the accumulator stage;
   storing at each clock cycle of the plurality of clock cycles a second complex polynomial coefficient $a_{p-1}$ at a fourth storage device coupled to a second input of the accumulator stage; and
   storing at each clock cycle the accumulator feedback output at a fifth storage device coupled to an input of the first storage device.

7. The method of claim 6, where calculating the final working loop variable z comprises:
   storing the accumulator feedback output from the fifth storage device at the first storage device during the additional plurality of clock cycles;
   sequentially storing the plurality of input values ($|x_0|, |x_1|, \ldots |x_N|$) at the second storage device during the additional plurality of clock cycles;
   storing at each clock cycle the output of the multiplier stage at the third storage device;
   storing at each clock cycle of the additional plurality of clock cycles a complex polynomial coefficient $a_n$ at the fourth storage device; and
   storing at each clock cycle the accumulator feedback output at the fifth storage device.

8. The method of claim 7, where multiplying the final working loop variable z and the complex input vector x comprises:
   storing the final working loop variable z in the first storage device;
   storing the complex input vector x at the second storage device; and
   storing the output of the multiplier stage as the final multiplier value in the third storage device.

9. The method of claim 8, where adding the least significant complex polynomial coefficient to the final multiplier value comprises:
   storing the final multiplier value at the third storage device;
   storing the least significant complex polynomial coefficient in the fourth storage device; and
   storing the output of the accumulator stage as the result of the polynomial evaluation at the fifth storage device.

10. A device for evaluating a polynomial expression of order P, comprising:
    a multiplier hardware stage coupled to receive first and second multiplier operands from first and second clocked latch circuits, where the multiplier hardware stage generates a product of the first and second multiplier operands at a multiplier hardware stage output over a plurality of clock cycles;
    an accumulator stage coupled to receive first and second addition operands from third and fourth clocked latch circuits, where the accumulator stage generates a sum of the first and second addition operands at an accumulator stage output over the plurality of clock cycles, where the accumulator stage is coupled to receive the second addition operand from the multiplier hardware stage output, and where the accumulator stage output is selectively coupled in feedback to provide the second multiplier operand to the multiplier hardware stage.

11. The device of claim 10, further comprising a multiplex selection circuit coupled to receive a first complex polynomial coefficient $a_p$ at a first input and to receive the accumulator stage output at a second input, where the multiplex selection circuit is controlled to output the first complex polynomial coefficient $a_p$ only during a plurality of initiation clock cycles.

12. The device of claim 10, where the first clocked latch circuit comprises a flip-flop storage device for sequentially storing a plurality of input values ($|x_0|, |x_1|, \ldots |x_N|$) from a real input vector |x| which are sequentially input as the first multiplier operand over a plurality of clock cycles.

13. The device of claim 10, where the second clocked latch circuit comprises a flip-flop storage device for storing a first complex polynomial coefficient $a_p$ during a plurality of initiation clock cycles, and for storing a plurality of final working loop values ($z_0, z_1, \ldots z_N$) generated and fed back by the accumulator stage over an additional plurality of clock cycles.

14. The device of claim 10, where the third clocked latch circuit comprises a flip-flop storage device for sequentially storing a plurality of complex polynomial coefficients ($a_{p-1}, a_{p-2}, \ldots a_0$), each of which is sequentially input as the first addition operand over N clock cycles.

15. The device of claim 10, where the fourth clocked latch circuit comprises a flip-flop storage device for sequentially storing the product of the first and second multiplier operands generated at the multiplier hardware stage output over a plurality of clock cycles.

16. The device of claim 10, further comprising a fifth clocked latch circuit comprising a flip-flop storage device for sequentially storing the sum of the first and second addition operands generated at the accumulator stage output over a plurality of clock cycles.

17. The device of claim 10, where the clocked latch circuits are clocked so that the multiplier hardware stage and accumulator stage carry out Horner's rule on the polynomial expression of order P by performing complex multiply and addition operations in each clock cycle to process different values from a complex input vector $x=(x_0, x_1, \ldots x_N)$.

18. A multiply and accumulate feedback circuit for evaluating a polynomial of order P different values from a complex input vector $x=(x_0, x_1, \ldots x_N)$, comprising:
    a multiplier circuit for computing a product of first and second multiplier operands input to the multiplier circuit, where the product is output at a multiplier stage output at each clock cycle;
    an accumulator circuit coupled to the multiplier stage output for computing a sum of first and second addition operands input to the accumulator circuit, where the sum is output at an accumulator stage output at each clock cycle;
    a feedback storage device coupled to the accumulator stage output for storing the sum for feedback as in input to the multiplier circuit;
    an input multiplexer circuit coupled to the feedback storage device for multiplexing a first complex polynomial coefficient $a_p$ and the accumulator stage output by applying a first control signal to output the first complex polynomial coefficient $a_p$ during a plurality of initiation clock cycles and to output the accumulator stage output during a plurality of additional clock cycles;

first and second clocked storage devices for providing the first and second multiplier operands to the multiplier circuit; and third and fourth clocked storage devices for providing the first and second addition operands to the accumulator circuit, where the clocked storage devices are clocked so that the multiplier circuit and accumulator circuit carry out Horner's rule on the polynomial of order P by performing complex multiply and addition operations in each clock cycle to process different values from the complex input vector $x=(x_0, x_1, \ldots x_N)$.

19. The multiply and accumulate feedback circuit of claim 18, where the first clocked storage device sequentially provides a plurality of input values $(|x_0|, |x_1|, \ldots |x_N|)$ from the real input vector $|x|$ as the first multiplier operand over the initiation clock cycles and the plurality of additional clock cycles, and where the second clocked storage device provides the output from the input multiplexer circuit over the initiation clock cycles and the plurality of additional clock cycles.

20. The multiply and accumulate feedback circuit of claim 18, where the third clocked storage device provides a plurality of complex polynomial coefficients $(a_{p-1}, a_{p-2}, \ldots a_0)$, each of which is sequentially input as the first addition operand over N clock cycles, and where the fourth clocked storage device provides the multiplier stage output over the initiation clock cycles and the plurality of additional clock cycles.

* * * * *